US012606701B2

(12) United States Patent
Kogawa et al.

(10) Patent No.: US 12,606,701 B2
(45) Date of Patent: Apr. 21, 2026

(54) POLYMER COMPOSITION AND MOLDED ARTICLE

(71) Applicant: TORAY INDUSTRIES, INC., Tokyo (JP)

(72) Inventors: Taisuke Kogawa, Otsu (JP); Jiao Lu, Otsu (JP); Koji Kadowaki, Kamakura (JP); Masataka Nakamura, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 477 days.

(21) Appl. No.: 18/021,701

(22) PCT Filed: Oct. 18, 2021

(86) PCT No.: PCT/JP2021/038379

§ 371 (c)(1),
(2) Date: Feb. 16, 2023

(87) PCT Pub. No.: WO2022/091833

PCT Pub. Date: May 5, 2022

(65) Prior Publication Data

US 2023/0323115 A1 Oct. 12, 2023

(30) Foreign Application Priority Data

Oct. 30, 2020 (JP) ................................ 2020-182149

(51) Int. Cl.
*C08L 67/04* (2006.01)

(52) U.S. Cl.
CPC ........... *C08L 67/04* (2013.01); *C08L 2201/06* (2013.01); *C08L 2205/025* (2013.01)

(58) Field of Classification Search
None
See application file for complete search history.

(56) References Cited

U.S. PATENT DOCUMENTS 6,573,340 B1 6/2003 Khemani et al.
8,129,477 B1 * 3/2012 Zhang .................. A61L 31/148 523/124
9,873,790 B1 * 1/2018 Andjelic ............... A61L 17/105
2002/0090398 A1 * 7/2002 Dunn .................. A61K 9/0024 424/486
2013/0065046 A1 3/2013 Krishnaswamy
2014/0329974 A1 11/2014 Lim et al.
2015/0148496 A1 * 5/2015 Jamiolkowski ......... A61L 27/58 525/411
2016/0213499 A1 * 7/2016 Zheng ..................... A61F 2/915
2018/0327589 A1 * 11/2018 Marcille ................. C08L 67/04
2020/0181396 A1 6/2020 Lendlein et al.
2020/0216607 A1 7/2020 Kakizawa et al.
2022/0251372 A1 8/2022 Harimoto et al.

FOREIGN PATENT DOCUMENTS

JP 2015-505897 A 2/2015
JP 2015-193750 A 11/2015
JP 2017-179234 A 10/2017
JP 2020-92874 A 6/2020
WO WO 2019/035357 A1 2/2019
WO WO 2020/241624 A1 12/2020

OTHER PUBLICATIONS

CAS_MSDS_Polydioxanone_Melting_Point_Boiling_Point_Density_CAS_Chemical_Properties (Year: 2017).*
Copolymerizations_of_-Caprolactone_and_GlycolideA_Comparison_of_Tin_II_Octanoate_and_Bismuth_III_Subsalicylate_as_Initiators (Year: 2005).*
By Rudnik, E. ( Compostable Polymer Properties and Packaging Application, Ebnesajjad: Plastic Films in Food Packaging. DOI: http://dx.doi.org/10.1016/B978-1-4557-3112-1.00013-2 Â® 2013 Elsevier Inc. All rights reserved. Adapted from a chapter in: Rudnik, Compostable Polymer Materials (2008)) (Year: 2013).*
Extended European Search Report for European Application No. 21885952.8, dated Oct. 7, 2024.
International Search Report, issued in PCT/JP2021/038379, PCT/ISA/210, dated Dec. 28, 2021.

(Continued)

*Primary Examiner* — Robert S Jones, Jr.
*Assistant Examiner* — Lily K Sloan
(74) *Attorney, Agent, or Firm* — Birch, Stewart, Kolasch & Birch, LLP

(57) ABSTRACT

Disclosed is a polymer composition including a polyester copolymer and a biodegradable polymer, wherein the polyester copolymer includes two types of ester bond-forming monomer residues as main structural units, when the two types of ester bond-forming monomers are defined as "monomer A" and "monomer B", respectively, the polyester copolymer satisfies (1) to (3) below, the biodegradable polymer has a melting point of 100° C. or higher, and the biodegradable polymer is included in an amount of 0.1% by weight or more and less than 30% by weight in 100% by weight of the total of the polyester copolymer and the biodegradable polymer. The present invention provides a polymer composition having low Young's modulus and high tensile strength. (1) An R value represented by the following formula is 0.45 or more and 0.99 or less. R=[AB]/(2[A][B])×100, where [A]: molar fraction (%) of monomer A residues in the polyester copolymer, [B]: molar fraction (%) of monomer B residues in the polyester copolymer, and [AB]: molar fraction (%) of a structure in which monomer A residues and monomer B residues are adjacent to each other (A-B and B-A) in the polyester copolymer. (2) A crystallization rate of monomer A residues and a crystallization rate of monomer B residues are less than 14%. (3) A melting point is lower than 100° C. or a clear melting point does not exist.

13 Claims, No Drawings

(56) References Cited

OTHER PUBLICATIONS

Written Opinion of the International Searching Authority, issued in PCT/JP2021/038379, PCT/ISA/237, dated Dec. 28, 2021.

* cited by examiner

POLYMER COMPOSITION AND MOLDED ARTICLE

TECHNICAL FIELD

The present invention relates to a polymer composition including a polyester copolymer and a biodegradable polymer.

BACKGROUND ART

Polyesters produced from ester bond-forming monomers, typified by polylactic acid, polyglycolic acid, polycaprolactone or copolymers thereof, are attracting attention as biodegradable or bioabsorbable polymers, and are used in various fields, for example, medical materials such as sutures, sustained release materials for pharmaceuticals, agricultural chemicals, fertilizers and the like. Polyesters are also expected as packaging materials such as containers and films as biodegradable general-purpose plastics.

However, in general, biodegradable polyesters and bioabsorbable polyesters produced from ester bond-forming monomers are fragile. Therefore, attempts have been made to develop various copolymers for the purpose of improving mechanical properties to obtain a biodegradable polymer having practical strength and moldability.

For example, there has been proposed, as a biodegradable/bioabsorbable polymer having low Young's modulus and high tensile strength, a polyester copolymer including residues of two types of ester bond-forming monomers ("monomer A" and "monomer B") as main structural units in which an R value represented by the following formula is 0.45 or more and 0.99 or less, and a crystallization rate of at least one of monomer A residues and monomer B residues is less than 14% (see, for example, Patent Document 1):

$$R=[AB]/(2[A][B])\times 100$$

where

- [A]: molar fraction (%) of monomer A residues in the polyester copolymer,
- [B]: molar fraction (%) of monomer B residues in the polyester copolymer, and
- [AB]: molar fraction (%) of a structure in which monomer A residues and monomer B residues are adjacent to each other in the polyester copolymer.

Attempts have also been made to improve mechanical properties by mixing a plurality of biodegradable polymers. For example, there have been proposed, as a composition having improved strength, flexibility, elongation percentage, tenacity and the like, a biodegradable polymer blend including a hard synthetic biodegradable polymer and a soft synthetic biodegradable polymer, the biodegradable polymer blend having higher strength and/or elongation than those of the hard or soft biodegradable polymer by themselves (see, for example, Patent Document 2), a resin composition including a polylactic acid, an L-lactide/ε-caprolactone copolymer and a filler (see, for example, Patent Document 3), a blend of poly D-lactic acid and an L-lactide/ε-caprolactone copolymer or a blend of poly L-lactic acid and a D-lactide/ε-caprolactone copolymer (see, for example, Patent Document 4) and the like.

PRIOR ART DOCUMENTS

Patent Documents

Patent Document 1: WO 2019/35357
Patent Document 2: JP 2008-255349 A

Patent Document 3: JP 2017-179234 A
Patent Document 4: JP 2020-529483 W

SUMMARY OF THE INVENTION

Problems to be Solved by the Invention

In general, it has been known that polylactic acid and polyglycolic acid have high crystallinity and have high Young's modulus and are hard. However, those polymers have poor softness and are inferior in bio-followability required for medical materials. It has also been reported that its hardness causes damage to surrounding tissues or protrusion accidents when embedded in the body.

Therefore, it has been studied to impart the softness by copolymerizing polycaprolactone with these polymers. The multi-gradient polymer mentioned in Patent Document 1 has low Young's modulus and has improved softness which was a conventional problem, and thus the polymer is suitable for a filler and a covering material. Meanwhile, in applications such as transplantation into joints which require followability against large deformations, the tensile strength was insufficient and further improvement was required.

The resin compositions mentioned in Patent Documents 2 to 4 have high Young's modulus and inferior in bio-followability and moldability, and thus materials having low Young's modulus are required.

In view of the above problems, an object of the present invention is to provide a polymer composition having low Young's modulus and high tensile strength.

Solutions to the Problems

The present invention for solving the above problems is as follows.

A polymer composition including a polyester copolymer and a biodegradable polymer, wherein

- the polyester copolymer includes two types of ester bond-forming monomer residues as main structural units,
- when the two types of ester bond-forming monomers are defined as "monomer A" and "monomer B", respectively, the polyester copolymer satisfies (1) to (3) below,
- the biodegradable polymer has a melting point of 100° C. or higher, and
- the biodegradable polymer is included in an amount of 0.1% by weight or more and less than 30% by weight in 100% by weight of the total of the polyester copolymer and the biodegradable polymer:

(1) an R value represented by the following formula is 0.45 or more and 0.99 or less:

$$R=[AB]/(2[A][B])\times 100$$

where

- [A]: molar fraction (%) of monomer A residues in the polyester copolymer,
- [B]: molar fraction (%) of monomer B residues in the polyester copolymer, and
- [AB]: molar fraction (%) of a structure in which monomer A residues and monomer B residues are adjacent to each other (A-B and B-A) in the polyester copolymer, (2) a crystallization rate of monomer A residues and a crystallization rate of monomer B residues are less than 14%, and (3) a melting point is lower than 100° C. or a clear melting point does not exist.

Effects of the Invention

According to the present invention, it is possible to obtain a polymer composition suitable for medical applications and elastomer applications, which has low Young's modulus, biodegradability and bioabsorbability, and also has high tensile strength.

Embodiments of the Invention

The polymer composition of the present invention includes a polyester copolymer and a biodegradable polymer. The polyester copolymer is a copolymer including two types of ester bond-forming monomer residues as main structural units. Herein, the two types of ester bond-forming monomers are sometimes referred to as "monomer A" and "monomer B", respectively. The monomer residues derived from "monomer A" and "monomer B" in the copolymer formed from "monomer A" and "monomer B" are sometimes referred to as "monomer A residue" and "monomer B residue", respectively.

The term "ester bond-forming monomer" refers to a monomer forming a polymer in which monomer units are connected by an ester bond, that is, polyester, by polymerization of the monomer.

It is preferable to use hydroxycarboxylic acid as the ester bond-forming monomer. It is also possible to preferably use a lactone which is a cyclic compound obtained by intramolecular dehydration condensation of a hydroxy group and a carboxyl group of hydroxycarboxylic acid, and a lactide which is a cyclic compound obtained by dehydration condensation of mutual hydroxy group and carboxyl group of two molecules of hydroxycarboxylic acid.

It is particularly preferable to use an aliphatic hydroxycarboxylic acid as the hydroxycarboxylic acid. Examples of the aliphatic hydroxycarboxylic acid include lactic acid, glycolic acid, hydroxybutyric acid, hydroxyvaleric acid, hydroxycaproic acid, hydroxyheptanoic acid, hydroxyoctanoic acid, hydroxynonanoic acid, hydroxydecanoic acid, hydroxyundecanoic acid, hydroxydodecanoic acid, (2-hydroxyethoxy)acetic acid and the like. A compound selected from lactic acid, glycolic acid, hydroxyvaleric acid and hydroxycaproic acid is particularly preferable.

Any of L-Lactic acid, D-lactic acid, and a mixture thereof can be used as lactic acid, and L-lactic acid is preferably used from the aspects of physical properties and biocompatibility of the polymer to be obtained. When the mixture is used as a monomer, the L-isomer content is preferably 85% or more, and more preferably 95% or more.

It is possible to use, as lactone, butyrolactone, valerolactone, caprolactone, dioxepanone, ethylene oxalate, p-dioxanone, trimethylene carbonate, β-propiolactone, pivalolactone and the like. Butyrolactone, valerolactone, caprolactone, p-dioxanone and trimethylene carbonate are particularly preferable, and valerolactone or caprolactone is more preferable.

It is possible to use, as lactide, dilactide obtained by dehydration condensation of two molecules of lactic acid, glycolide obtained by dehydration condensation of two molecules of glycolic acid, and tetramethyl glycolide, and dilactide or glycolide is particularly preferable.

It is also possible to use, as the ester bond-forming monomer, derivatives of the monomers exemplified above.

Of these, in the present invention, each of the monomer A and the monomer B is more preferably a compound selected from the group consisting of lactic acid, glycolic acid, hydroxybutyric acid, hydroxyvaleric acid, hydroxycaproic acid, hydroxyheptanoic acid, hydroxyoctanoic acid, hydroxynonanoic acid, hydroxydecanoic acid, hydroxyundecanoic acid, hydroxydodecanoic acid, (2-hydroxyethoxy) acetic acid, butyrolactone, valerolactone, caprolactone, dioxepanone, ethylene oxalate, p-dioxanone, trimethylene carbonate, 1-propiolactone, pivalolactone, dilactide, glycolide and tetramethyl glycolide. The monomer A is preferably a compound selected from the group consisting of lactic acid, glycolic acid, dilactide and glycolide, and particularly preferably lactic acid or glycolic acid. The monomer B preferably a compound selected from the group consisting of hydroxyvaleric acid, hydroxycaproic acid, valerolactone and caprolactone compound, and particularly preferably caprolactone or 5-valerolactone.

Herein, among two types of ester bond-forming monomers, a homopolymer composed only of monomer residues thereof with high crystallinity is defined as monomer A, and a homopolymer with low crystallinity is defined as a monomer B.

The crystallinity of the homopolymer is measured by the DSC method using a differential scanning calorimeter, as mentioned below. For example, heat of fusion per unit weight of a homopolymer composed only of lactic acid residues is 135 J/g, and heat of fusion per unit weight of a homopolymer composed only of caprolactone residues is 51 J/g. That is, when the polyester copolymer includes the lactic acid residue and the caprolactone residue as main constituent units, lactic acid is a monomer A and caprolactone is a monomer B.

In the present invention, both the crystallization rate of the monomer A residue and the crystallization rate of the monomer B residue in the polyester copolymer are less than 14%. When the crystallization rate is less than 14%, an increase in Young's modulus is suppressed, thus making it possible to obtain a polymer composition suitable for medical materials and elastomer applications. The crystallization rate of the monomer A residue and the monomer B residue is preferably 10% or less, and more preferably 5% or less.

The crystallization rate of the monomer residue as used herein is a ratio of heat of fusion per unit weight of the monomer residues in the polyester copolymer to the product of heat of fusion per unit weight of a homopolymer composed only of certain monomer residues and the weight fraction of the monomer residues in the polyester copolymer.

That is, the crystallization rate of the monomer A residue is a ratio of heat of fusion per unit weight of the monomer A residue in the polyester copolymer to the product of heat of fusion per unit weight of a homopolymer composed only of the monomer A residues and the weight fraction of the monomer A residue in the polyester copolymer. The crystallization rate of each of the monomer A residue and the monomer B residue indicates a ratio of formation of a crystal structure in the monomer A residue or the monomer B residue of the polyester copolymer.

When the monomer A residue is a lactic acid residue and the monomer B residue is a caprolactone residue, the crystallization rate of the lactic acid residue and the caprolactone residue is preferably less than 14%, and more preferably 10% or less.

The crystallization rate is specifically determined by the following method.

The polyester copolymer is dissolved in chloroform so as to have a concentration of 5% by weight, and the solution is transferred onto a Teflon petri dish and dried under normal pressure at room temperature for one day and night. This is dried under reduced pressure to obtain a polyester copolymer film. The polyester copolymer film thus obtained is placed on alumina PAN, measured by DSC method with a differential scanning calorimeter under the following conditions, and then the crystallization rate is calculated from the measurement results of a melting peak observed between temperature conditions (D) to (E).

Device name: EXSTAR 6000 (manufactured by Seiko Instruments Inc.)

Temperature conditions: (A) 25° C.→(B) 250° C. (10° C./min)→(C) 250° C. (5 min)→(D) −70° C. (10° C./min)→(E) 250° C. (10° C./min)→(F) 250° C. (5 min)→(G) 25° C. (100° C./min)

Standard material: Alumina

Here, the above temperature conditions mean as follows: the temperature is raised from 25° C. to 250° C. at a rate of 10° C./min (1st run), and after holding at 250° C. for 5 minutes, the temperature is fallen to −70° C. at a rate of 10° C./min, followed by temperature rising again to 250° C. at a rate of 10° C./min (2nd run), holding at 250° C. for 5 minutes and further temperature falling to 25° C. at a rate of 100° C./min. That is, the melting peak observed between the temperature conditions (D) to (E) means the melting peak during temperature rising of 2nd run (the same shall apply hereinafter).

Next, each of a homopolymer composed only of monomer A residues and a homopolymer composed only of monomer B residues, which forms a polyester copolymer, is fabricated. The crystallinity of each homopolymer can be measured in the same manner as in the measurement of a polyester copolymer mentioned above using a differential scanning calorimeter (DSC).

The crystallization rate is calculated by the following formulas.

Crystallization rate of monomer A=(heat of fusion per unit weight of monomer A residues in polyester copolymer)/{(heat of fusion per unit weight of homopolymer composed only of monomer A residues)×(weight fraction of monomer A residues in polyester copolymer)}×100(%)

Crystallization rate of monomer B=(heat of fusion per unit weight of monomer B residues in polyester copolymer)/{(heat of fusion per unit weight of homopolymer composed only of monomer B residues)×(weight fraction of monomer B residues in polyester copolymer)}×100(%)

Herein, the term "monomer residue" is, in principle, a repeating unit of a chemical structure derived from the monomers, in the chemical structure of a copolymer obtained by polymerizing two or more monomers including the monomers. For example, when lactic acid ($CH_3CH(OH)COOH$) and caprolactone (ε-caprolactone: the following formula)

[Chemical Formula 1]

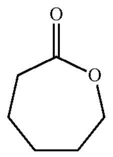

are polymerized to obtain a copolymer of lactic acid and caprolactone,

[Chemical Formula 2]

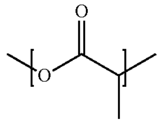

(R1)

the unit represented by the above formula is a lactic acid monomer residue, and the unit represented by the following formula is a caprolactone monomer residue.

[Chemical Formula 3]

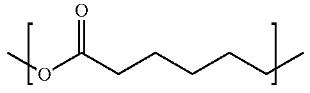

As an exception, when a dimer such as lactide is used as a monomer, the "monomer residue" means one of a structure repeated twice derived from the dimer. For example, when dilactide (L-(−)-lactide: the following formula)

[Chemical Formula 4]

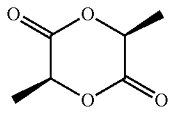

is polymerized with caprolactone, a structure represented by the above formula (R1), that is, a lactic acid residue is repeated twice as a monomer residue derived from dilactide is formed in the chemical structure of the copolymer. In this case, one of lactic acid residues is regarded as "monomer residue". That is, two lactic acid residues which are "monomer residues" derived from dilactide which is a monomer are considered to be formed.

Including two types of monomer residues as "main structural units" means that the sum of the number of the two types of monomer residues is 50% by mol or more when the sum of the number of all monomer residues included in the whole polymer including other monomer residues is 100% by mol, and the number of each residue is 20% by mol or more when the sum of the number of all monomer residues included in the whole polymer is 100% by mol. For example, including monomer A residues and monomer B residues as main structural units means that the sum of the number of residues of the monomer A residues and the monomer B residues is 50% by mol or more when the sum of the number of all monomer residues included in the whole polymer is 100% by mol, and the number of the monomer A residues is 20% by mol or more and the number of the monomer B residues is 20% by mol or more. Here, the molar fractions of the monomer A residues, the monomer B residues and other residues can be determined from area values of signals derived from respective residues by nuclear magnetic resonance (NMR) measurement. For example, when the monomer A residue is a lactic acid residue and the monomer B residue is a caprolactone residue, the molar fractions thereof can be measured by the method mentioned in Measurement Example 1 mentioned later.

When the sum of the number of all monomer residues included in the whole polymer including other monomer residues is 100% by mol, the sum of the monomer A residues and the monomer B residues is preferably 75 mol % or more, and more preferably 90 mol % or more. When the sum of the number of all monomer residues included in the whole polymer is 100% by mol, the number of each of the monomer A residues and the monomer B residues is preferably 30 mol % or more, and more preferably 40 mol % or more. A particularly preferred embodiment is a polymer in which the sum of the monomer A residues and the monomer B residues is 100% by mol of the whole polymer, that is, a polymer composed only of the monomer A and the monomer B.

As long as the effects of the present invention are not impaired, another monomer which can be copolymerized with two types of ester bond-forming monomers constituting the main structural units can be also further copolymerized. As such a monomer, yet another one of the monomer A and the monomer B of the above-mentioned ester bond-forming monomers can be used.

It is also a preferred embodiment to copolymerize monomers which function as a linker. Examples of the monomers which function as a linker include hydroxycarboxylic acids different from the two types of ester bond-forming monomers constituting the main structural units, dialcohols, dicarboxylic acids, amino acids, diamines, diisocyanates, diepoxides and the like.

By including a monomer other than the ester bond-forming monomers as a structural unit, it shall be written herein as a "polyester copolymer" including a copolymer partially including a structural unit connected by a bond other than an ester bond.

The polyester copolymer preferably has biodegradability or bioabsorbability. A person skilled in the art can synthesize a copolymer which exhibits appropriate biodegradability or bioabsorbability depending on applications, by appropriately combining the above-exemplified monomers and adjusting the amount ratio of the monomers within the range specified in the present invention.

The polyester copolymer has a melting point of lower than 100° C. or has no clear melting point. The melting point can be measured using a melting point measuring apparatus or DSC, and is preferably measured using DSC. When measuring using DSC, the melting point is specifically determined by the following method.

The polyester copolymer is dissolved in chloroform so as to have a concentration of 5% by weight, and the solution is transferred onto a Teflon petri dish and dried under normal pressure at room temperature for one day and night. This is dried under reduced pressure to obtain a polyester copolymer film. The polyester copolymer film thus obtained is placed on alumina PAN, measured by DSC method with a differential scanning calorimeter under the following conditions, and then the temperature of the melting peak observed between the following temperature conditions (D) to (E) is defined as a melting point. When no clear melting peak is observed in this range, it is considered to have no clear melting point.

Device name: EXSTAR 6000 (manufactured by Seiko Instruments Inc.)

Temperature conditions: (A) 25° C.→(B) 250° C. (10° C./min)→(C) 250° C. (5 min)→(D) −70° C. (10° C./min)→(E) 250° C. (10° C./min)→(F) 250° C. (5 min)→(G) 25° C. (100° C./min)

Standard material: Alumina

In the polyester copolymer, regarding the molar ratio of the monomer A residues to the monomer B residues, since the polyester copolymer approaches homopolymer-like characteristics when one monomer is excessively present, the molar ratio of the monomer A residues is preferably 20 to 80%, more preferably 30 to 70%, and still more preferably 40 to 60%, relative to 100% of the total mol number of the monomer A residues and the monomer B residues.

The polyester copolymer has an R value of 0.45 or more and 0.99 or less, which is represented by the following formula, when the two types of ester bond-forming monomers are defined as "monomer A" and "monomer B", respectively.

$$R=[AB]/(2[A][B])\times 100$$

[A]: molar fraction (%) of monomer A residues in the polyester copolymer,

[B]: molar fraction (%) of monomer B residues in the polyester copolymer, and

[AB]: molar fraction (%) of a structure in which the monomer A residues and the monomer B residues are adjacent to each other (A-B and B-A) in the polyester copolymer The R value is used as an index indicating randomness of a sequence of monomer residues in a copolymer including two types of ester bond-forming monomer residues, that is, the monomer A residues and the monomer B residues, as main structural units. For example, in a random copolymer with completely random monomer sequences, the R value is 1.

The R value can be determined by quantifying the ratio of the number of A-A, B-B, A-B and B-A of combinations of two adjacent monomers (hereinafter sometimes referred to as dyad) by nuclear magnetic resonance (NMR) measurement. Specifically, it shall be measured by the method mentioned in Measurement Example 1 mentioned later. For example, when the polyester copolymer is composed only of a monomer A and a monomer B, [AB] means a ratio of the total number of A-B dyads and B-A dyads relative to the total number of all dyads (A-A, B-B, A-B, B-A) in the polyester copolymer. For example, when the polyester copolymer is composed of three components, monomer A, monomer B and monomer C, [AB] means a ratio of the total number of A-B dyads and B-A dyads relative to the total number of all dyads (A-A, B-B, A-B, B-A, A-C, C-A, B-C, C-B, C-C) in the polyester copolymer. The same shall apply when the polyester copolymer is composed of four or more monomers.

When the R value is less than 0.45, the polyester copolymer may have high crystallinity and the resulting molded article may become hard, leading to an increase in Young's modulus. Meanwhile, when the R value exceeds 0.99, the resulting molded article may become too soft and exhibits adhesiveness, leading to deterioration of the handleability. From the same viewpoint, the R value of the polyester copolymer is preferably 0.45 to 0.85 or 0.50 to 0.99, more preferably 0.45 to 0.80 or 0.50 to 0.85, and still more preferably 0.50 to 0.80.

In order to control the tensile strength in a preferred range, the weight average molecular weight of the polyester copolymer is preferably 60,000 or more, more preferably 100,000 or more, and still more preferably 150,000 or more. Although the upper limit is not particularly limited, in order to control the moldability in a preferred range, the weight average molecular weight is preferably 1,000,000 or less, more preferably 800,000 or less, and still more preferably 500,000 or less. The weight average molecular weight of the polyester copolymer can be measured, for example, by the method mentioned in Measurement Example 2.

As an example, the polyester copolymer can be produced by a method for producing a polyester copolymer, which includes:

a macromer synthesis step of mixing monomers A and monomers B, which are two types of ester bond-forming monomers in an amount so that the sum of monomer A residues and monomer B residues in the resulting polyester copolymer is 50% by mol or more of all residues, and each of the monomer A residues and the monomer B residues is 20% by mol or more of all residues at the completion of polymerization, followed by polymerization; and a multimerization step of multimerizing by connecting macromers obtained in the macromer synthesis step, or additionally adding the monomer A and the monomer B to a macromer solution obtained in the macromer synthesis step, followed by further polymerization.

[Macromer Synthesis Step]

In the macromer synthesis step, the monomers A and the monomers B are mixed in an amount so that the sum of the monomer A residues and the monomer B residues in the resulting polyester copolymer is theoretically 50% by mol or more of all residues, and each of the monomer A residues and the monomer B residues is 20% by mol or more of all residues at the completion of polymerization, followed by polymerization. As a result, a polyester copolymer having the monomer A residues and the monomer B residues as main structural units is obtained. However, in this production method, since a multimerization step mentioned later is further carried out, the polyester copolymer obtained by this step is referred to as "macromer" herein.

As the ester bond-forming monomer, the same monomer as mentioned above can be used, and preferred combinations and the like are also the same as mentioned above.

Randomness of the distribution of monomer residues constituting a polyester copolymer having two types of ester bond-forming monomer residues as main structural units varies depending on the reactivity of monomers during polymerization. That is, when the same monomer and the other monomer are bonded with the same probability after one of the two types of monomers during polymerization, a copolymer in which the monomer residues are distributed completely at random can be obtained. However, when either monomer tends to bond after one of the monomers, a gradient copolymer having biased distribution of the monomer residues is obtained. In the gradient copolymer thus obtained, the composition of the monomer residues continuously changes from the polymerization start terminal to the polymerization end terminal along the molecular chain.

Here, assuming that the monomer A is a monomer having an initial polymerization rate higher than that of the monomer B, when the monomer A and the monomer B are copolymerized in the macromer synthesis step, the monomer A tends to bond after the monomer A. Therefore, in the synthesized macromer, a gradient structure forming a composition gradient in which the ratio of the monomer A unit gradually decreases from the polymerization start terminal to the polymerization end terminal is formed. That is, the macromer obtained in this step is a macromer having a gradient structure in which the monomer A residues and the monomer B residues form a composition gradient in a skeleton due to a difference in the initial polymerization rate between the monomer A and the monomer B. That is, it is possible to obtain a macromer having a gradient structure forming a composition gradient in a skeleton by using the monomer A and the monomer B, which exhibit different initial polymerization rates, in this step. Such a macromer is sometimes referred to as "gradient macromer" herein.

In the macromer synthesis step, in order to realize such a gradient structure, it is desirable to synthesize a macromer by a polymerization reaction that occurs in one direction from the start terminal. As such a synthesis reaction, it is preferable to use ring-opening polymerization or living polymerization.

In order to facilitate the production of a polyester copolymer which finally satisfies the R value mentioned above, the macromer obtained in this step has an R value similar to that of the polyester copolymer, that is, an R value represented by the following formula:

$$R=[AB]/(2[A][B])\times 100$$

where

[A]: molar fraction (%) of monomer A residues in the macromer,

[B]: molar fraction (%) of monomer B residues in the macromer, and

[AB]: molar fraction (%) of a structure in which the monomer A residues and the monomer B residues are adjacent to each other (A-B and B-A) in the macromer, is preferably 0.45 or more and 0.99 or less, and more preferably 0.50 or more and 0.80 or less.

The weight average molecular weight of the macromer synthesized in the macromer synthesis step is preferably 10,000 or more, and more preferably 20,000 or more. In order to suppress the crystallinity and maintain the softness, the weight average molecular weight of the macromer is preferably 150,000 or less, and more preferably 100,000 or less.

[Multimerization Step]

In the multimerization step, multimerization is carried out by connecting a plurality of macromers obtained in the macromer synthesis step, or additionally adding the monomer A and the monomer B to a macromer solution obtained in the macromer synthesis step, followed by further polymerization. In this step, the macromers obtained in one macromer synthesis step may be connected, or a plurality of macromers obtained in two or more macromer synthesis steps may be connected. The term "multimerization" means to form a polyester copolymer having a structure in which a plurality of macromonomer units having a gradient structure in which the monomer A residues and the monomer B residues have a composition gradient in the skeleton are connected.

The number of macromer units to be multimerized may be 2 or more, but it is preferably 3 or more, more preferably 4 or more, and still more preferably 6 or more since the effect of improving the tensile strength due to entanglement of molecular chains is obtained when the number of connections is large. Meanwhile, when the molecular weight of the polyester copolymer is excessively increased, there is a concern that moldability may be adversely affected by an increase in viscosity, thus the number of macromer units is preferably 80 or less, more preferably 40 or less, and still more preferably 20 or less.

The number of connections of macromer units can be adjusted according to a catalyst used in the multimerization step and the reaction time. When multimerization is carried out by connecting macromers, the number of macromer units can be obtained by dividing the weight average molecular weight of the finally obtained polyester copolymer by the weight average molecular weight of the macromer.

The polyester copolymer of the present invention may be a linear polymer in which macromer units are linearly connected, or may be a branched polymer which is branched and connected.

The linear polyester copolymer can be synthesized, for example, by bonding molecules of the same gradient macromer one by one to both ends of the gradient macromer through the ends.

When the gradient macromer has a hydroxyl group and a carboxyl group at each end, the ends are condensed with a condensing agent to obtain a multimerized polyester copolymer. It is possible to use, as the condensing agent, 4,4-dimethylaminopyridinium p-toluenesulfonate, 1-[3-(dimethylamino)propyl]-3-ethylcarbodiimide, 1-ethyl-3-(3-dimethylaminopropyl)carbodiimide hydrochloride, N,N'-dicyclohexylcarbodiimide, N,N'-diisopropylcarbodiimide, N,N'-carbonyldiimidazole, 1,1'-carbonyldi(1,2,4-triazole), 4-(4,6-dimethoxy-1,3,5-triazin-2-yl)-4-methylmorpholinium=chloride n hydrate, (4,6-dimethoxy-1,3,5-triazin-2-yl)-(2-octoxy-2-oxoethyl)dimethylammonium trifluoromethanesulfonate, 1H-benzotriazol-1-yloxytris(dimethylamino)phosphonium hexafluorophosphate, 1H-benzotriazol-1-yloxytripyrrolidinophosphonium hexafluorophosphate, (7-azabenzotriazol-1-yloxy) tripyrrolidinophosphonium hexafluorophosphate, chlorotripyrrolidinophosphonium hexafluorophosphate, bromotris(dimethylamino)phosphonium hexafluorophosphate, 3-(diethoxyphosphoryloxy)-1,2,3-benzotriazin-4(3H)-one, O-(benzotriazol-1-yl)-N,N,N',N'-tetramethyluronium hexafluorophosphate, O-(7-azabenzotriazol-1-yl)-N,N,N',N'-tetramethyluronium hexafluorophosphate, O—(N-succinimidyl)-N,N,N',N'-tetramethyluronium tetrafluoroborate, O—(N-succinimidyl)-N,N,N',N'-tetramethyluronium hexafluorophosphate, O-(3,4-dihydro-4-oxo-1,2,3-benzotriazin-3-yl)-N,N,N',N'-tetramethyluronium tetrafluoroborate, S-(1-oxide-2-pyridyl)-N,N,N',N'-tetramethylthiuronium tetrafluoroborate, O-[2-oxo-1(2H)-pyridyl]-N,N,N',N'-tetramethyluronium tetrafluoroborate, {{[(1-cyano-2-ethoxy-2-oxoethylidene)amino]oxy}-4-morpholinomethylene}dimethylammonium hexafluorophosphate, 2-chloro-1,3-dimethylimidazolinium hexafluorophosphate, 1-(chloro-1-pyrrolidinylmethylene) pyrrolidinium hexafluorophosphate, 2-fluoro-1,3-dimethylimidazolinium hexafluorophosphate, fluoro-N,N,N',N'-tetramethylformamidinium hexafluorophosphate and the like.

When the polymerization reaction has living characteristics, that is, when the polymerization reaction can be started continuously from the end of the polymer, multimerization can be achieved by repeating an operation of additionally adding the monomer A and the monomer B to the gradient macromer solution after completion of the polymerization reaction, followed by further polymerization.

Alternatively, the gradient macromers may be multimerized via a linker as long as mechanical characteristics of the polymer are not affected. In particular, when a linker having a plurality of carboxyl groups and/or a plurality of hydroxy groups, for example, 2,2-bis(hydroxymethyl)propionic acid, is used, a branched polyester copolymer having the linker as a branch point can be synthesized.

The polyester copolymer obtained by the production method as mentioned above is a copolymer having a structure in which two or more macromer units having a gradient structure in which the monomer A residues and the monomer B residues have a composition gradient in the skeleton are connected, which is a preferred embodiment of the polyester copolymer of the present invention. Herein, such a structure is sometimes referred to as "multi-gradient" referred to herein for convenience, and a copolymer having a multi-gradient structure is sometimes referred to as "multi-gradient copolymer". In other words, the polyester copolymer is preferably a multi-gradient copolymer.

The polyester copolymer preferably has a structure in which two or more macromer units are connected, and more preferably has a structure in which three or more macromer units are connected. The upper limit of the number of connections of the macromer units is preferably 80 or less, more preferably 40 or less, and still more preferably 20 or less.

As mentioned above, a polyester copolymer in which the monomer A residue is a lactic acid residue and the monomer B residue is a caprolactone residue is a particularly preferred embodiment of the present invention. Such a polyester copolymer is preferably produced by the following production method.

First, in the macromer synthesis step, dilactide and ε-caprolactone are polymerized in the presence of a catalyst. Dilactide and ε-caprolactone monomer are preferably purified to remove impurities prior to use. Dilactide can be purified, for example, by recrystallization from toluene dried over sodium used as a solvent. ε-Caprolactone is purified, for example, by distillation under reduced pressure from $CaH_2$ under $N_2$ atmosphere.

It is possible to use, as the catalyst for the macromer synthesis step having a lactic acid residue and a caprolactone residue, normal polyester polymerization catalysts such as a germanium-based catalyst, a titanium-based catalyst, an antimony-based catalyst or a tin-based catalyst. Specific examples of the polyester polymerization catalyst include tin octylate, antimony trifluoride, zinc powder, dibutyltin oxide, tin oxalate and the like. The method for adding the catalyst to a reaction system is not particularly limited, but it is preferably a method in which the catalyst is added in a state of being dispersed in a raw material when the raw material is charged or in a state of being dispersed at the start of pressure reduction. The amount of the catalyst used is 0.01 to 3 parts by weight, and more preferably 0.05 to 1.5 parts by weight in terms of metal atoms, based on 100 parts by weight of the total amount of the monomers used.

A macromer having a lactic acid residue and a caprolactone residue can be obtained by charging dilactide, caprolactone and a catalyst in a reaction vessel equipped with a stirrer and reacting at 120 to 250° C. under a nitrogen stream. When water is used as a co-initiator, it is preferable to perform a cocatalyst reaction at around 90° C. prior to the polymerization reaction. The reaction time is 2 hours or more, preferably 4 hours or more, and more preferably a longer time, for example, 8 hours or more, to increase the degree of polymerization. However, when the reaction is carried out for excessively long time, a problem of coloring the polymer occurs, and thus the reaction time is preferably 3 to 30 hours.

Next, in the multimerization step, the ends of the gradient macromer having a lactic acid residue and a caprolactone residue are connected by a condensation reaction, and multimerized. The reaction temperature of the condensation reaction is preferably 10 to 100° C., and more preferably 20 to 50° C. The reaction time is 1 day or more, and more preferably 2 days or more. However, when the reaction is carried out for excessively long time, a problem of coloring the polymer occurs, and thus the reaction temperature is preferably 2 to 4 days.

The polyester copolymer is a polyester copolymer having a structure in which two or more macromer units are connected, and in the monomer A and the monomer B, the macromer unit preferably includes, as main structural units, monomer A residues and monomer B residues which satisfy the inequality $1.1 \leq V_X/V_Y 40$, where $V_X$ is an initial polymerization rate of the monomer which has higher initial polymerization rate and $V_Y$ is an initial polymerization rate of the monomer which has lower initial polymerization rate. When using the above polyester copolymer having a structure in which two or more macromer units, composed of a polyester copolymer including, as main structural units, monomer A residues and monomer B residues which satisfy the inequality $1.1 \leq V_X/V_Y \leq 40$, are connected, macromer units having a gradient structure can be obtained, thus obtaining a polyester copolymer having a multi-gradient structure, preferably.

Here, in the monomer A and the monomer B, $V_X$ as an initial polymerization rate of the monomer which has higher initial polymerization rate and $V_Y$ as an initial polymerization rate of the monomer which has lower initial polymerization rate are obtained by the following method. The monomers A and the monomers B are mixed in equimolar amounts, and a solvent and a catalyst are added thereto if necessary, and then a polymerization reaction is started by adjusting conditions such as temperature so that an R value is the same as the R value mentioned later in the polyester copolymer finally synthesized or to be synthesized within an error range of 10%. Sampling is periodically carried out from a sample during polymerization, and the remaining amounts of the monomers A and the monomers B are measured. The remaining amount is measured by, for example, chromatography or nuclear magnetic resonance (NMR) measurement. By subtracting the remaining amount from the charged amount of each monomer, the amount of monomers subjected to the polymerization reaction is obtained. When the amounts of monomers subjected to the polymerization reaction are plotted against the sampling time, the initial slopes of the curves are $V_X$ and $V_Y$.

When the initial polymerization rate of the monomer A is higher than the initial polymerization rate of the monomer B, there is a high probability that the monomer A is bonded to the polymer terminal during polymerization in the initial stage of polymerization. Meanwhile, in the latter stage of the polymerization in which the monomer A is consumed and the concentration in the reaction solution decreases, the probability that the monomer B is bonded to the polymer terminal during the polymerization increases. As a result, a gradient polymer in which the ratio of the monomer A residues gradually decreases from one terminal is obtained. Such a gradient polymer has low crystallinity and also suppresses an increase in Young's modulus. In order to facilitate formation of such a gradient structure, $V_X/V_Y$ is more preferably 1.3 or more, and still more preferably 1.5 or more. Meanwhile, when the difference in polymerization rate between the monomer A and the monomer B is too large, the structure becomes close to a block polymer in which only the monomers A are polymerized and then the monomers B are polymerized, and the crystallinity may increase, leading to an increase in Young's modulus. Therefore, $V_X/V_Y$ is more preferably 30 or less, still more preferably 20 or less, and yet more preferably 10 or less.

Preferred combinations of the monomer A and the monomer B include dilactide and ε-caprolactone, glycolide and ε-caprolactone, glycolide and dilactide, dilactide and dioxepanone, ethylene oxalate and dilactide, dilactide and δ-valerolactone, and glycolide and δ-valerolactone.

The polymer composition of the present invention includes a polyester copolymer and a biodegradable polymer, and the biodegradable polymer has a melting point of 100° C. or higher. The method for measuring a melting point is the same as the measurement method of a polyester copolymer mentioned above. However, in the fabrication of the sample film, when the biodegradable polymer is poorly soluble in chloroform, the solvent may be appropriately changed, or the film may be fabricated by a melt molding method such as a heat press method.

Biodegradability means the property of being decomposed in vivo, and the biodegradable polymer means a polymer having such property. Examples of the term which can be used interchangeably with biodegradability include bioabsorbability, biocompatibility and the like. Examples of the biodegradable polymer include polylactic acid, polyglycolic acid, polydioxanone, polyvalerolactone, polyhydroxybutyrate, polyhydroxyvalerate, polyhydroxyhexanoate, polybutylene succinate, polybutylene succinate adipate, polybutylene adipate terephthalate, polytetramethylene adipate terephthalate, polyethylene terephthalate succinate, polyvinyl alcohol and the like. Copolymers of the above biodegradable polymers may be used, but in the present invention, they are limited to those having a melting point of 100° C. or higher. It may also be a mixture thereof or a mixture with a water-soluble polymer such as polyalkylene glycol. Of these, polymers selected from polylactic acid, polyglycolic acid, polybutylene succinate, polyhydroxybutyrate, polyhydroxyhexanoate, polyhydroxybutyrate hexanoate and polydioxanone, or mixtures thereof are preferred.

The polyalkylene glycol is a polymer in which one or more alkylene glycols are polymerized. Examples of the polyalkylene glycol include polyethylene glycol, propylene glycol and the like, and copolymers thereof.

In the polymer composition of the present invention, in order to control the tensile strength within a suitable range, 0.1% by weight or more and less than 30% by weight of the biodegradable polymer is included in 100% by weight of the total of the polyester copolymer and the biodegradable polymer. The biodegradable polymer is preferably included in an amount of 0.1% by weight or more and less than 20% by weight, more preferably 0.5% by weight to 15% by weight, and still more preferably 1.0% by weight to 10% by weight.

The ratio of the tensile strength of the polymer composition to the tensile strength of the polyester copolymer alone is preferably 1.3 or more, more preferably 1.5 or more, and still more preferably 2 or more. When the content of the biodegradable polymer in the polymer composition is too high, the Young's modulus may increase, and the ratio of the Young's modulus of the polymer composition to the Young's modulus of the polyester copolymer alone is preferably 5 or less, more preferably 3 or less, still more preferably 2.5 or less, and most preferably 2 or less.

The polymer composition of the present invention can also include fillers. Examples of the filler include inorganic fillers such as talc, silica, clay, wollastonite, xonotlite, aluminum borate, mica, glass flakes, carbon black, alumina, ferrite, graphite, carbon nanotubes, graphene, zeolite, hydroxyapatite, β-tricalcium phosphite, phosphate, α-tricalcium phosphate, calcium carbonate, calcium silicate, magnesium silicate, sodium silicate, potassium titanate, zinc oxide, iron oxide, calcium oxide, magnesium oxide and titanium oxide; and organic fillers such as aramid fiber, carbon fiber, glass fiber, gypsum fiber and polyester fiber.

Although the content of the filler in the polymer composition is not particularly limited, in order to control the biodegradability in a suitable range, the filler is preferably added in an amount of 0 to 3 parts by weight, more preferably 0 to 1 part by weight, and still more preferably 0 to 0.1 part by weight, relative to 100 parts by weight of the total of the polyester copolymer and the biodegradable polymer. The smaller the amount of filler, the better. Therefore, particularly preferred embodiment is an embodiment in which no filler is included, in other words, an embodiment in which the content of the filler is 0 part by weight relative to 100 parts by weight of the total of the polyester copolymer and the biodegradable polymer.

The polymer composition of the present invention preferably has a Young's modulus of 6.3 MPa or less and a tensile strength of 5 MPa or more. In order to control the bio-followability within a suitable range, the Young's modulus of the polymer composition is more preferably 0.1 to 6.3 MPa. The lower limit of the Young's modulus is more preferably 1.0 MPa or more. The upper limit of the Young's modulus is more preferably 5.0 MPa or less. For the same reason, the tensile strength of the polymer composition is more preferably 5 to 100 MPa. The lower limit of the tensile strength is more preferably 10 MPa or more, still more preferably 15 MPa or more, particularly preferably 20 MPa or more, and most preferably 30 MPa or more. The upper limit of the tensile strength is more preferably 80 MPa or less, and particularly preferably 50 MPa or less.

Here, the Young's modulus and tensile strength of the polymer composition can be measured according to the method defined in JIS K6251(2017). Specifically, the polymer composition is dissolved in chloroform so as to have a concentration of 5% by weight, and the solution was transferred onto a Teflon petri dish and dried under normal pressure at room temperature for one day and night. The film having a thickness of about 0.1 mm obtained by drying under reduced pressure is cut into strips (30 mm×5 mm), and then a tensile test is carried out using a small desktop tester EZ-LX (manufactured by Shimadzu Corporation) under the following conditions:

Initial length: 10 mm

Tensile speed: 500 ram/min

Load cell: 1 kN and the Young's modulus and tensile strength are measured. The Young's modulus and tensile strength of the polymer composition can be determined by measuring each three times and calculating the average value.

The polymer composition of the present invention can include components other than the polyester copolymer and the biodegradable polymer as long as they do not impair the effects of the present invention. In 100% by weight of the polymer composition of the present invention, the polyester copolymer and the biodegradable polymer is preferably included in the total amount of 50 to 100% by weight, more preferably 70 to 100% by weight, and still more preferably 90 to 100% by weight.

The polymer composition of the present invention can be suitably used as a molded article made of the polymer composition of the present invention. The molded article of the present invention will be described below.

The molded article of the present invention is composed of the polymer composition of the present invention. In the present invention, the term "molded article" means an object obtained by molding the polymer composition of the present invention into various shapes according to the purposes by a conventional method. Examples of the molded article include membranous bodies (membranes, films, sheets), plate-shaped bodies (boards), rod-shaped bodies (rods), cylindrical bodies (pipes, tubes), thread-shaped bodies (filaments), reticulated bodies (mesh), bags, woven fabrics or non-woven fabrics.

The polymer composition of the present invention is suitably molded and used as filaments. Thus, the filaments of the present invention are made of the polymer composition of present the present invention. In the present invention, the filament means a thread-shaped body, that is, a thread-shaped molded article, as mentioned above. The filament is used in the state of a multifilament obtained by twisting a plurality of filaments into a single yarn, or a monofilament obtained by forming one filament into a single yarn.

The polymer composition of the present invention can be suitably used for medical molded articles. The medical molded article is a molded article mentioned above which is used for medical applications. Examples of medical applications include, but are not limited to, sutures, artificial bones, artificial skin, wound dressings, carries and microneedles for DDS, scaffold materials for tissue and organ regeneration and the like.

The polymer composition of the present invention can be used as a stent. That is, the stent of the present invention is composed of the polymer composition of the present invention. Here, the stent is a radially expandable implant medical device and is transplanted inside various body cavities or vessels (for example, vascular system, esophagus, gastrointestinal tract, large and small intestine, bile duct, pancreas, lung duct, ureter and trachea). When the body cavities or vessels are narrowed, the stent is placed in the narrowed area to secure the lumen. Such the stent may be placed in the body cavities or vessels for a long period of time, or it may be retrieved and removed from the body after maintaining the lumen patency for a predetermined period of time.

The polymer composition of the present invention is also preferably used for 3D printer applications.

EXAMPLES

The present invention will be specifically described below by way of Examples, but the present invention should not be construed as being limited to those Examples.

Measurement Example 1: Measurement of Molar Fraction and R Value of Each Residue by Nuclear Magnetic Resonance (NMR)

The purified polyester copolymer was dissolved in deuterated chloroform and measured by $^1$H-NMR to calculate a ratio of lactic acid monomer residues and a ratio of caprolactone monomer residues in the polyester copolymer. By $^1$H homospin decoupling method, for a methine group of the lactic acid residue (around 5.10 ppm), an α-methylene group of the caprolactone residue (around 2.35 ppm) and an ε-methylene group (around 4.10 ppm) were separated whether the adjacent monomer residue is a lactic acid residue or a caprolactone residue, and each peak area was quantified. In the case of using δ-valerolactone instead of ε-caprolactone, similarly, for the methine group of the lactic acid (around 5.10 ppm), an α-methylene group of the valerolactone (around 2.35 ppm) and a δ-methylene group (around 4.10 ppm) were separated whether the adjacent monomer residue is a lactic acid residue or a valerolactone residue, and each peak area was quantified.

R value was calculated by calculating [AB] from each peak area ratio. Here, [AB] is a molar fraction of the structure in which the lactic acid residues and the caprolactone residues or valerolactone residues in the copolymer are adjacent to each other. Specifically, it is the ratio (%) of the sum of number of A-B dyads and B-A dyads relative to the total number of A-A dyads, A-B dyads, B-A dyads and B-B dyads. The results are shown in the table.

Device name: JNM-ECZ400R (manufactured by JEOL Ltd.) $^1$H Homospin decoupling irradiation position: 1.66 ppm Solvent: deuterated chloroform Measurement temperature: room temperature

Measurement Example 2: Measurement of Weight Average Molecular Weight by Gel Permeation Chromatography (GPC)

Device name: Prominence (manufactured by Shimadzu Corporation)

Mobile phase: chloroform (for HPLC) (manufactured by Wako Pure Chemical Industries, Ltd.)

Flow rate: 1 mL/min

Column: TSKgel GMHHR-M (φ7.8 mm×300 mm; manufactured by Tosoh Corporation)

Detector: UV (254 nm), RI

Column, detector temperature: 35° C.

Standard material: polystyrene

The purified polyester copolymer was dissolved in chloroform, passed through a 0.45 μm syringe filter (DISMIC-13HP; manufactured by ADVANTEC) to remove impurities and the like, and then measured by GPC to calculate a weight average molecular weight of the polyester copolymer. The results are shown in the table.

Measurement Example 3: Measurement of Crystallization Rate and Melting Point by Differential Scanning Calorimetry (DSC)

The polyester copolymer or biodegradable polymer was dissolved in chloroform so as to have a concentration of 5% by weight, and the solution was transferred onto a Teflon petri dish and dried under normal pressure at room temperature for one day and night. This was dried under reduced pressure to obtain a film having a thickness of about 100 μm. The film thus obtained (about 10 mg) was placed on alumina PAN, measured by DSC method with a differential scanning calorimeter under the following conditions, and then the crystallization rate was calculated from the measurement results of a melting peak observed between temperature conditions (D) to (E) using the formulas 1 and 2 mentioned later. The temperature at which the melting peak is observed was defined as a melting point, and if there is no clear melting peak, the polyester copolymer or biodegradable polymer shall not have a clear melting point.

When a plurality of melting peaks are observed in the copolymer and the like, the sum of the product of the temperature at which each melting peak is observed and the weight fraction of the monomer residue from which the melting peak is derived is defined as a melting point. That is, for example, when a plurality of melting peaks are observed are observed for a copolymer composed of monomer A residues and monomer B residues, it is possible to determine the melting point of the copolymer by the following formula:

{(temperature at which melting peak derived from monomer A residues is observed)×(weight fraction of monomer A residues in copolymer)+(temperature at which melting peak derived from monomer B residues is observed)×(weight fraction of monomer B residues in copolymer)}

Device name: EXSTAR 6000 (manufactured by Seiko Instruments Inc.)

Temperature conditions: (A) 25° C.→(B) 250° C. (10° C./min)→(C) 250° C. (5 min)→(D) −70° C. (10° C./min)→(E) 250° C. (10° C./min)→(F) 250° C. (5 min)→(G) 25° C. (100° C./min)

Standard material: Alumina

Crystallization rate of monomer A=(heat of fusion per unit weight of monomer A residues in polyester copolymer)/{(heat of fusion per unit weight of homopolymer composed only of monomer A residues)×(weight fraction of monomer A residue in polyester copolymer)}×100 　Formula 1

Crystallization rate of monomer B=(heat of fusion per unit weight of monomer B residues in polyester copolymer)/{(heat of fusion per unit weight of homopolymer composed only of monomer B residues)×(weight fraction of monomer B residue in polyester copolymer)}×100 　Formula 2

Here, the heat of fusion per unit weight of the homopolymer is determined as follows. A homopolymer composed only of monomer A residues constituting a polyester copolymer, and a homopolymer composed only of monomer B residues are respectively fabricated, and each homopolymer was dissolved in chloroform so as to have a concentration of 5% by weight, and the solution is transferred onto a Teflon petri dish and dried under normal pressure at room temperature for one day and night. This is dried under reduced pressure to obtain a film. The film thus obtained is placed on alumina PAN, measured by DSC method with a differential scanning calorimeter under the following conditions, and then the heat of fusion is read from a melting peak area of the graph obtained from the measurement results of a melting peak observed between temperature conditions (D) to (E).

Device name: EXSTAR 6000 (manufactured by Seiko Instruments Inc.)

Temperature conditions: (A) 25° C.→(B) 250° C. (10° C./min)→(C) 250° C. (5 min)→(D) −70° C. (10° C./min)→(E) 250° C. (10° C./min)→(F) 250° C. (5 min)→(G) 25° C. (100° C./min)

Standard material: Alumina

[Measurement Example 4: Measurement of Young's Modulus, Tensile Strength by Tensile Test)

The polymer composition was dried under reduced pressure, dissolved in chloroform so as to have a concentration of 5% by weight, and the solution was transferred onto a Teflon petri dish and dried under normal pressure at room temperature for one day and night. This was dried under reduced pressure at 50° C. for one day and night to obtain a film.

The film thus obtained (thickness: about 0.1 mm) was cut into strips (50 mm×5 mm), and a tensile test was carried out according to JIS K6251 (2017) under the following conditions, and then the Young's modulus and tensile strength were determined. The results are shown in the table.

When marking the specimen, two lines were marked on the specimen using an appropriate marker. The lines were placed at right angles to the parallel sections of the specimens, equidistant from the center of the specimens, and accurately and clearly marked.

Device name: EZ-1kNLX (manufactured by Shimadzu Access Corporation)

Distance between markers before test: 10 mm

Distance between grips: 10 mm (gripping position of marked line)

Tensile speed: 500 mm/min

Load cell: 1 kN

Synthesis Example 1

In a separable flask, 50.0 g of L-lactide (PURASORB L; manufactured by PURAC) and 39.6 g of ε-caprolactone (manufactured by FUJIFILM Wako Pure Chemical Corporation) as monomers and 0.45 g of hydroxypivalic acid as an initiator were charged. These were placed in an argon atmosphere, 0.27 g of tin(II) octylate (manufactured by FUJIFILM Wako Pure Chemical Corporation) which is a catalyst dissolved in 5.8 mL of toluene (super dehydrated) (manufactured by FUJIFILM Wako Pure Chemical Corporation) was added, followed by a reaction at 150° C. for 9.5 hours to obtain a crude copolymer.

The crude copolymer thus obtained was dissolved in 200 mL of chloroform, and the solution was added dropwise to 3,000 mL of stirred hexane to obtain a precipitate. The precipitate was dried under reduced pressure at 50° C. to obtain a macromer.

In a flask, 50 g of the macromer, 2.1 g of 4,4-dimethylaminopyridinium p-toluenesulfonate (synthetic product) as a catalyst and 0.87 g of 4,4-dimethylaminopyridine (manufactured by FUJIFILM Wako Pure Chemical Corporation) were charged. These were placed in an argon atmosphere and dissolved in 200 mL of dichloromethane (dehydrated) (manufactured by FUJIFILM Wako Pure Chemical Corporation) and 1.7 mL of diisopropylcarbodiimide (manufactured by FUJIFILM Wako Pure Chemical Corporation) as a condensing agent was added, followed by condensation polymerization at room temperature for one day and night.

The reaction mixture thus obtained was diluted with 220 mL of chloroform and 470 mL of 0.5 M hydrochloric acid was added, and after stirring for 30 minutes, the aqueous layer was removed by decantation. Thereafter, 470 mL of ion-exchanged water was added, and after stirring for 10 minutes, and the step of removing the aqueous layer by decantation was repeated until the pH of the removed aqueous layer reached 7. The remaining organic layer was added dropwise to 2,200 mL of stirred methanol to obtain a precipitate. This precipitate was dried under reduced pressure at 50° C. to obtain a purified polyester copolymer of Synthesis Example 1.

Synthesis Example 2

In the same manner as in Synthesis Example 1, except that the amount of toluene was changed to 3.0 mL, the reaction temperature to obtain the crude copolymer was changed to 140° C. and the amount of 4,4-dimethylaminopyridine was changed to 0.80 g, the synthesis was carried out to obtain a purified polyester copolymer of Synthesis Example 2.

Synthesis Example 3

In the same manner as in Synthesis Example 1, except that the amount of toluene was changed to 4.2 mL, the amount of 4,4-dimethylaminopyridinium p-toluenesulfonate was changed to 1.8 g, the amount of 4,4-dimethylaminopyridine was changed to 0.60 g and the amount of diisopropylcarbodiimide was changed to 1.5 mL, the synthesis was carried out to obtain a purified polyester copolymer of Synthesis Example 3.

Example 1

In a 50 mL screw tube, 987 mg of the polyester copolymer of Synthesis Example 1 and 13 mg of polylactic acid (manufactured by Nature3D) were added, and after dissolving in 20 mL of chloroform (manufactured by FUJIFILM Wako Pure Chemical Corporation), the solution was dried under normal pressure at room temperature for one day and night. This was dried under reduced pressure at 50° C. for one day and night to obtain a polymer composition of Example 1.

Example 2

The operation was carried out in the same manner as in Example 1, except that the amount of the polyester copolymer was changed to 979 mg and the amount of polylactic acid was changed to 21 mg, to obtain a polymer composition of Example 2.

Example 3

The operation was carried out in the same manner as in Example 1, except that the amount of the polyester copolymer was changed to 963 mg and the amount of polylactic acid was changed to 37 mg, to obtain a polymer composition of Example 3.

Example 4

The operation was carried out in the same manner as in Example 1, except that the amount of the polyester copolymer was changed to 877 mg and the amount of polylactic acid was changed to 123 mg, to obtain a polymer composition of Example 4.

Example 5

The operation was carried out in the same manner as in Example 1, except that polylactic acid (manufactured by Nature3D) was changed to polylactic acid (manufactured by Wako Pure Chemical Industries, Ltd.), to obtain a polymer composition of Example 5.

Example 6

The operation was carried out in the same manner as in Example 1, except that the amount of the polyester copolymer was changed to 979 mg, polylactic acid (manufactured by Nature3D) was changed to polylactic acid (manufactured by Wako Pure Chemical Industries, Ltd.) and the amount of polylactic acid was changed to 21 mg, to obtain a polymer composition of Example 6.

Example 7

The operation was carried out in the same manner as in Example 1, except that the amount of the polyester copolymer was changed to 959 mg, polylactic acid (manufactured by Nature3D) was changed to polylactic acid (manufactured by Wako Pure Chemical Industries, Ltd.) and the amount of polylactic acid was changed to 42 mg, to obtain a polymer composition of Example 7.

Example 8

The operation was carried out in the same manner as in Example 1, except that the amount of the polyester copolymer was changed to 921 mg, polylactic acid (manufactured by Nature3D) was changed to polylactic acid (manufactured by Wako Pure Chemical Industries, Ltd.) and the amount of polylactic acid was changed to 79 mg, to obtain a polymer composition of Example 8.

Comparative Example 1

In a 50 mL screw tube, 1,000 mg of the polyester copolymer of Synthesis Example 1 was added, and after dissolving in 20 mL of chloroform (manufactured by FUJIFILM Wako Pure Chemical Corporation), the solution was dried under normal pressure at room temperature for one day and night. This was dried under reduced pressure at 50° C. for one day and night to obtain a polymer composition of Comparative Example 1.

Comparative Example 2

The operation was carried out in the same manner as in Example 1, except that the amount of the polyester copolymer was changed to 594 mg and the amount of polylactic acid was changed to 406 mg, to obtain a polymer composition of Comparative Example 2.

Comparative Example 3

The operation was carried out in the same manner as in Example 1, except that the amount of polyester copolymer was changed to 498 mg and the amount of polylactic acid was changed to 502 mg, to obtain a polymer composition of Comparative Example 3.

Comparative Example 4

The operation was carried out in the same manner as in Example 1, except that the amount of the polyester copolymer was changed to 700 mg, polylactic acid (manufactured by Nature3D) was changed to polylactic acid (manufactured by Wako Pure Chemical Industries, Ltd.) and the amount of polylactic acid was changed to 300 mg, to obtain a polymer composition of Comparative Example 4.

Comparative Example 5

The operation was carried out in the same manner as in Example 1, except that the amount of the polyester copolymer was changed to 980 mg, 13 mg of polylactic acid (manufactured by Nature3D) was changed to 20 mg of polycaprolactone (manufactured by Sigma-Aldrich Co.), to obtain a polymer composition of Comparative Example 5.

Comparative Example 6

The operation was carried out in the same manner as in Example 1, except that the amount of polyester copolymer was changed to 899 mg, 13 mg of polylactic acid (manufactured by Nature3D) was changed to 101 mg of polycaprolactone (manufactured by Sigma-Aldrich Co.), to obtain a polymer composition of Comparative Example 6.

Comparative Example 7

The operation was carried out in the same manner as in Example 1, except that the amount of the polyester copolymer was changed to 500 mg and 13 mg of polylactic acid (manufactured by Nature3D) was changed to 500 mg of polycaprolactone (manufactured by Sigma-Aldrich Co.), to obtain a polymer composition of Comparative Example 7.

Example 9

The operation was carried out in the same manner as in Example 1, except that the amount of polyester copolymer was changed to 960 mg, polylactic acid (manufactured by Nature3D) was changed to polybutylene succinate (manufactured by Nature3D) and the amount of polybutylene succinate was changed to 40 mg, to obtain a polymer composition of Example 9.

Example 10

The operation was carried out in the same manner as in Example 1, except that the amount of polyester copolymer was changed to 813 mg and the amount of polylactic acid was changed to 187 mg, to obtain a polymer composition of Example 10.

Example 11

The operation was carried out in the same manner as in Example 1, except that the polyester copolymer of Synthesis Example 1 was changed to the polyester copolymer of Synthesis Example 2, the amount of the polyester copolymer was changed to 961 mg and the amount of polylactic acid was changed to 40 mg, to obtain a polymer composition of Example 11.

Example 12

The operation was carried out in the same manner as in Example 1, except that the polyester copolymer of Synthesis Example 1 was changed to the polyester copolymer of Synthesis Example 2, the amount of the polyester copolymer was changed to 900 mg and the amount of polylactic acid was changed to 100 mg, to obtain a polymer composition of Example 12.

Example 13

The operation was carried out in the same manner as in Example 1, except that the polyester copolymer of Synthesis Example 1 was changed to the polyester copolymer of Synthesis Example 3, the amount of the polyester copolymer was changed to 961 mg and the amount of polylactic acid was changed to 39 mg, to obtain a polymer composition of Example 13.

Example 14

The operation was carried out in the same manner as in Example 1, except that the polyester copolymer of Synthesis Example 1 was changed to the polyester copolymer of Synthesis Example 3, the amount of the polyester copolymer was changed to 880 mg and the amount of polylactic acid was changed to 120 mg, to obtain a polymer composition of Example 14.

Comparative Example 8

The operation was carried out in the same manner as in Example 1, except that the amount of the polyester copolymer was changed to 700 mg, polylactic acid (manufactured by Nature3D) was changed to polybutylene succinate (manufactured by Nature3D) and the amount of poly polybutylene succinate was changed to 300 mg, to obtain a polymer composition of Comparative Example 8.

Comparative Example 9

The operation was carried out in the same manner as in Comparative Example 1, except that the polyester copolymer of Synthesis Example 1 was changed to the polyester copolymer of Synthesis Example 2, to obtain a polymer composition of Comparative Example 9.

Comparative Example 10

The operation was carried out in the same manner as in Comparative Example 1, except that the polyester copolymer of Synthesis Example 1 was changed to the polyester copolymer of Synthesis Example 3, to obtain a polymer composition of Comparative Example 10.

With respect to the polymer compositions of Examples 1 to 14 and Comparative Examples 1 to 10, the measurements mentioned in Measurement Examples 1 to 4 were carried out. The results are shown in the tables. Since the film could not be fabricated in Comparative Example 8, the measurement of Measurement Example 4 could not be evaluated.

TABLE 1

| | Monomer A | Monomer B | R value | Monomer A residue crystallization rate (%) | Monomer B residue crystallization rate (%) | Melting point (° C.) | Polymer structure | $V_X/V_Y$ | Monomer A residue ratio (mol %) | Mw |
|---|---|---|---|---|---|---|---|---|---|---|
| Synthesis Example 1 | Lactic acid | Caprolactone | 0.85 | 0 | 0 | Having no clear melting point | Structure in which two or more macromer units are connected | 4.1 | 50 | 293,078 |
| Synthesis Example 2 | Lactic acid | Caprolactone | 0.63 | 0 | 0 | Having no clear melting point | Structure in which two or more macromer units are connected | 4.1 | 50 | 278,831 |
| Synthesis Example 3 | Lactic acid | Caprolactone | 0.74 | 0 | 0 | Having no clear melting point | Structure in which two or more macromer units are connected | 4.1 | 51 | 212,525 |

TABLE 2

| | | Biodegradable polymer | | | | Filler | | Total of polyester copolymer and biodegradable polymer | Composition | |
|---|---|---|---|---|---|---|---|---|---|---|
| | Polyester copolymer Component | Component | Melting point (° C.) | Mw | Content (% by mass) | Component | Content (% by mass) | Content (% by mass) | Young's modulus (MPa) | Tensile strength (MPa) |
| Example 1 | Synthesis Example 1 | Polylactic acid | 177 | 199,804 | 1.3 | — | 0 | 100 | 2.2 | 29.1 |
| Example 2 | Synthesis Example 1 | Polylactic acid | 177 | 199,804 | 2.1 | — | 0 | 100 | 2.0 | 30.9 |
| Example 3 | Synthesis Example 1 | Polylactic acid | 177 | 199,804 | 3.7 | — | 0 | 100 | 1.9 | 34.9 |
| Example 4 | Synthesis Example 1 | Polylactic acid | 177 | 199,804 | 12.3 | — | 0 | 100 | 2.5 | 23.6 |
| Example 5 | Synthesis Example 1 | Polylactic acid | 174 | 10,521 | 1.3 | — | 0 | 100 | 2.1 | 28.7 |
| Example 6 | Synthesis Example 1 | Polylactic acid | 174 | 10,521 | 2.1 | — | 0 | 100 | 2.2 | 30.7 |
| Example 7 | Synthesis Example 1 | Polylactic acid | 174 | 10,521 | 4.2 | — | 0 | 100 | 3.8 | 32.1 |
| Example 8 | Synthesis Example 1 | Polylactic acid | 174 | 10,521 | 7.9 | — | 0 | 100 | 5.8 | 37.7 |

TABLE 2-continued

| | | Biodegradable polymer | | | | Filler | | Total of polyester copolymer and biodegradable polymer | Composition | |
|---|---|---|---|---|---|---|---|---|---|---|
| | Polyester copolymer Component | Component | Melting point (° C.) | Mw | Content (% by mass) | Component | Content (% by mass) | Content (% by mass) | Young's modulus (MPa) | Tensile strength (MPa) |
| Example 9 | Synthesis Example 1 | Polybutylene succinate | 115 | 127,268 | 4.0 | — | 0 | 100 | 3.4 | 25.6 |
| Example 10 | Synthesis Example 1 | Polylactic acid | 177 | 199,804 | 18.7 | — | 0 | 100 | 2.6 | 23.4 |
| Example 11 | Synthesis Example 2 | Polylactic acid | 177 | 199,804 | 4.0 | — | 0 | 100 | 2.5 | 39.2 |
| Example 12 | Synthesis Example 2 | Polylactic acid | 177 | 199,804 | 10.0 | — | 0 | 100 | 2.6 | 28.8 |
| Example 13 | Synthesis Example 3 | Polylactic acid | 177 | 199,804 | 3.9 | — | 0 | 100 | 2.8 | 35.6 |
| Example 14 | Synthesis Example 3 | Polylactic acid | 177 | 199,804 | 12.1 | — | 0 | 100 | 3.3 | 24.3 |
| Comparative Example 1 | Synthesis Example 1 | — | — | — | 0.0 | — | 0 | 100 | 2.2 | 17.7 |
| Comparative Example 2 | Synthesis Example 1 | Polylactic acid | 177 | 199,804 | 40.6 | — | 0 | 100 | 8.3 | 18.8 |
| Comparative Example 3 | Synthesis Example 1 | Polylactic acid | 177 | 199,804 | 50.2 | — | 0 | 100 | 53.8 | 20.2 |
| Comparative Example 4 | Synthesis Example 1 | Polylactic acid | 174 | 10,521 | 30.0 | — | 0 | 100 | 21.8 | 26.2 |
| Comparative Example 5 | Synthesis Example 1 | Polycaprolactone | 61 | 203,514 | 2.0 | — | 0 | 100 | 2.0 | 18.9 |
| Comparative Example 6 | Synthesis Example 1 | Polycaprolactone | 61 | 203,514 | 10.1 | — | 0 | 100 | 2.0 | 10.3 |
| Comparative Example 7 | Synthesis Example 1 | Polycaprolactone | 61 | 203,514 | 50.0 | — | 0 | 100 | 21.9 | 19.9 |
| Comparative Example 8 | Synthesis Example 1 | Polybutylene succinate | 115 | 127,268 | 30.0 | — | 0 | 100 | — | — |
| Comparative Example 9 | Synthesis Example 2 | — | — | — | 0.0 | — | 0 | 100 | 2.5 | 21.2 |
| Comparative Example 10 | Synthesis Example 3 | — | — | — | 0.0 | — | 0 | 100 | 3.1 | 16.5 |

The monomer A residue ratio in the table indicates a molar ratio of the monomer A residue relative to 100% of the total mol number of the monomer A residues and the monomer B residues.

Mw in the table indicates a weight average molecular weight.

INDUSTRIAL APPLICABILITY

As specific applications of the polymer composition of the present invention, uses for non-woven fabrics as fibers, disposable toiletry products and cosmetics as containers, packaging films, agricultural multi-films and tapes as films and the like are considered. As other medical applications, sutures, artificial bones, artificial skin, wound dressings, carries and microneedles for DDS, scaffold materials for tissue and organ regeneration and the like are considered. Furthermore, uses for other binders for toner, thermal transfer ink and 3D printers are considered, but applications are not limited thereto.

The invention claimed is:

1. A polymer composition comprising a polyester copolymer and a biodegradable polymer, wherein the polyester copolymer includes two types of ester bond-forming monomer residues as main structural units, when the two types of ester bond-forming monomers are defined as "monomer A" and "monomer B", respectively, the polyester copolymer satisfies (1) to (3) below, the biodegradable polymer has a melting point of 100° C. or higher, and the biodegradable polymer is included in an amount of 0.1% by weight or more and less than 30% by weight in 100% by weight of the total of the polyester copolymer and the biodegradable polymer, and the polymer composition has a Young's modulus of 0.1 to 6.3 MPa and a tensile strength of 5 to 100 MPa:

(1) an R value represented by the following formula is 0.45 or more and 0.99 or less:

$$R=[AB]/(2[A][B])\times 100$$

where

[A]: molar fraction (%) of monomer A residues in the polyester copolymer,

[B]: molar fraction (%) of monomer B residues in the polyester copolymer, and

[AB]: molar fraction (%) of a structure in which monomer A residues and monomer B residues are adjacent to each other (A-B and B-A) in the polyester copolymer, (2) a crystallization rate of monomer A residues and a crystallization rate of monomer B residues are less than 14%, and (3) a melting point is lower than 100° C. or a clear melting point does not exist.

2. The polymer composition according to claim 1, wherein each of the monomer A and the monomer B is a compound selected from the group consisting of lactic acid, glycolic acid, hydroxybutyric acid, hydroxyvaleric acid, hydroxycaproic acid, hydroxyheptanoic acid, hydroxyoctanoic acid, hydroxynonanoic acid, hydroxydecanoic acid, hydroxyundecanoic acid, hydroxydodecanoic acid, (2-hydroxyethoxy) acetic acid, butyrolactone, valerolactone, caprolactone, dioxepanone, ethylene oxalate, p-dioxanone, trimethylene carbonate, β-propiolactone, pivalolactone, dilactide, glycolide and tetramethyl glycolide.

3. The polymer composition according to claim 1, wherein the monomer A is a compound selected from the group consisting of lactic acid, glycolic acid, dilactide and glycolide.

4. The polymer composition according to claim 1, wherein the monomer B is a compound selected from the group consisting of hydroxyvaleric acid, hydroxycaproic acid, valerolactone and caprolactone.

5. The polymer composition according to claim 1, wherein the biodegradable polymer is a polymer selected from the group consisting of polylactic acid, polyglycolic acid, polybutylene succinate, polyhydroxybutyrate, polyhydroxyhexanoate, polyhydroxybutyrate hexanoate and polydioxanone, or mixtures thereof.

6. The polymer composition according to claim 1, comprising a filler in an amount of 0 to 3 parts by weight relative to 100 parts by weight of the total of the polyester copolymer and the biodegradable polymer.

7. The polymer composition according to claim 1, wherein the polyester copolymer has a weight average molecular weight of 60,000 or more.

8. The polymer composition according to claim 1, which has a Young's modulus of 1.0 to 6.3 MPa and a tensile strength of 30 to 100 MPa.

9. The polymer composition according to claim 1, wherein the polyester copolymer is a polyester copolymer having a structure in which two or more macromer units are connected, and in the monomer A and the monomer B, the macromer unit includes, as main structural units, monomer A residues and monomer B residues which satisfy the inequality $1.1 \leq V_X/V_Y \leq 40$, where $V_X$ is an initial polymerization rate of the monomer which has higher initial polymerization rate and $V_Y$ is an initial polymerization rate of the monomer which has lower initial polymerization rate.

10. The polymer composition according to claim 1, comprising 50 to 100% by weight of the total of the polyester copolymer and the biodegradable polymer in 100% by weight of the polymer composition.

11. A molded article comprising the polymer composition according to claim 1.

12. A filament comprising the polymer composition according to claim 1.

13. A stent comprising the polymer composition according to claim 1.

* * * * *